April 30, 1935.  C. KRTIL  1,999,569
MATERIAL SEPARATING SIFTING EXTRUSION DEVICE
Filed July 15, 1932
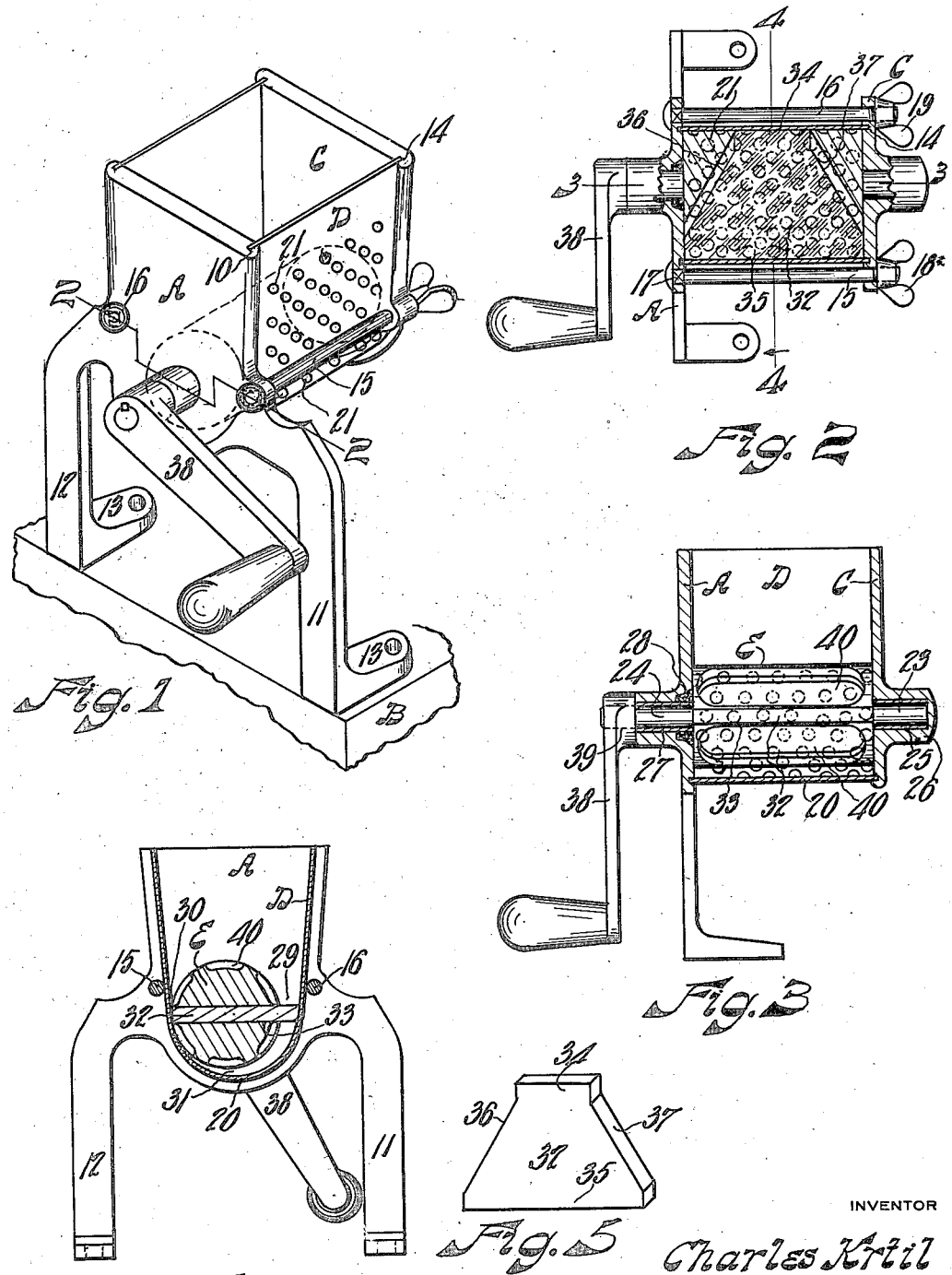
INVENTOR
Charles Krtil
BY
C. F. Heinkel
ATTORNEY Patented Apr. 30, 1935

1,999,569

UNITED STATES PATENT OFFICE 1,999,569

MATERIAL SEPARATING-SIFTING-EXTRUSION DEVICE

Charles Krtil, Cleveland, Ohio

Application July 15, 1932, Serial No. 622,604

5 Claims. (Cl. 146—174)

My invention relates to improvements in devices which, in the prior art, are known as sifting devices.

My invention aims to use sifting in its broader sense but to add thereto the separating of component parts of material placed into the device, as, for instance, separating the shells of beans from the meat thereof, also add thereto a means to sift the material as, for instance, to sift the above-mentioned shells from the meat, and also extrude from the device one or more components of the material as, for instance, the above-mentioned meat.

The objects of my invention are: to provide a device of simple structure and ease of operation which sifts material placed therein; which separates the parts composing the material; and which extrudes or squeezes out of the device one or more of the component parts as desired and to temporarily retain in the device the parts which are not to be extruded; which is acid and rust proof so that acid or acid containing material can be operated upon in the device; which is leak proof so that juice of material liberated in the device can not drip from the device except through the openings provided for that purpose; which can be assembled easily and taken apart easily for cleaning or other purposes; and in which material therein is taken hold of in different manners and itself mixed and agitated during the operation of the device.

I attain my objects by the mechanism illustratively shown in the accompanying drawing, forming part of this specification, in which drawing:

Fig. 1 is a perspective view of a device embodying my invention and having material separating means, material sifting means, and material extrusion means.

Fig. 2 is a transverse section taken on the line 2—2 of Fig. 1.

Fig. 3 is a longitudinal vertical section taken on the line 3—3 of Fig. 2.

Fig. 4 is a transverse vertical section taken on the line 4—4 of Fig. 2.

Fig. 5 is a perspective view of the floating member detached from the device.

Similar reference characters refer to similar parts throughout the views.

The device shown in the accompanying drawing comprises and operates as follows:

The end plate A has the groove 10 in a side thereof for purposes appearing herein below and also has the legs 11 and 12 on the bottom thereof for support of the device and to elevate the below mentioned receptacle above a table top of any other supporting structure so that a pan or other vessel can be placed under the receptacle; the legs are spaced sidewise of each other to clear and to permit the pan or other vessel to be placed below the receptacle to receive the discharge from the receptacle and also to be removed at will.

The toes 13 extend sidewise or laterally from the lower end of the legs and under the receptacle and may be made long enough to keep the device from falling over if it is not fastened down but may be made shorter and fastened to the base B which, in turn, may be fastened to a table or other support.

If the device is to be fastened to a vertical surface, such as a wall, the legs are modified accordingly. The drawing teaches the installation of the device and the accommodation of the pan sufficiently to enable mechanical skill to make the modification without resorting to invention.

The end plate C has the groove 14 in a side thereof for purposes appearing herein below. The drawings show the grooves 10 and 14 to be of the same form and the open ends thereof facing each other. This structure can be modified when it is desired to use for the receptacle a shell of other than the symmetrical contour or form shown.

The shell D is of a contour corresponding to the contour of the grooves and the ends thereof extend into the grooves and form therein a seal sufficiently tight or leakproof to prevent leakage there.

The end plates are held against the shell by means of the bolts 15 and 16 which pass or extend through both of the plates but outside of the shell. The bolts are held against rotation in at least one of the plates as, for instance, by having the square parts 17 in corresponding square holes in the plate A. The wing nuts 18 and 19 are threaded onto the corresponding screws so that manipulation thereof will tighten the plates against the shell as well as release the plates from the shell. Complete removal of the wing nuts permits the device to be completely disassembled for cleaning thereof or other purposes.

The structure of the end plates and the shell between the same, held together by the bolts, forms a receptacle as mentioned above to receive material to be operated upon.

The shell D, as exemplified herein, has the rounded bottom 20, preferably concentric with a definite axis, and has the extrusion or discharge holes 21 through this rounded bottom part. The shell is open at the top and is closed at each side by the end plates. The side walls of the shell are here made straight and divergent from each other to form a receptacle which progressively decreases in voluminal capacity downward of the receptacle. The grooves 10 and 14 are formed according to the required shape or contour of the shell.

The member E is shown as a one piece part having the body part 22 and the journal parts 23 and 24 on each longitudinal side thereof and concentric therewith.

The journal part 23 is shown as journaled in the bushing 25 which is driven into the boss 26 on the end plate 14. The outer end of the boss 26 closes the journal against leakage of the receptacle.

The journal part 24 is shown as journaled in the bushing 27 and the packing 28 is introduced to seal the receptacle against leakage at this joint.

The longitudinal axis of the member E is parallel with the axis of the rounded bottom of the shell and spaced to one side thereof in a horizontal plane so that the member E is eccentrically journaled in the receptacle and the space 29 horizontally between the member E and one side wall of the shell is greater than the space 30 at the opposite side wall and the vertical space 31 between the member E and the rounded bottom of the shell is less or smaller than the space at the mentioned one side wall and greater or larger than the space at the mentioned opposite side wall.

The member 32 is shown as mounted in the slot 33 extending transversely through the member E and being of a width corresponding to the distance between the walls of the shell measured on the above mentioned horizontal plane.

The side 34 of the member 32 is of less length than the side 35 and the sides 36 and 37 slope from the respective ends of the sides 34 and 35 as shown.

The extrusion or discharge holes 21 are shown as being staggered so that the member 32, in its operation in the receptacle, does not come opposite a complete row of holes at any one stage of its rotation but will come opposite the holes more successively and thereby provide more smooth operation of the device and better discharge of material through the holes.

The operating handle 38 engages the end 39 of the member E to rotate the same in the journals thereof and can be permanently or removably attached as desired. The grooves or pockets 40 are provided in the member E to collect the skins or other fibrous component parts of the material which parts are not to be squeezed or forced out through the extrusion or discharge holes.

As to operation of the specific device shown and described:

Material to be operated upon, beans for instance, is placed into the receptacle through the open top thereof.

Upon rotation of the member E by the handle 38, in a clockwise direction, or whatever means is provided for rotation of the member E, and assuming that the operation starts with the member 32 located as shown in Fig. 4, the progressively decreasing distance between the circumference of the member E and the wall of the shell at the right hand side of Fig. 4, moves the member 32 transversely in the member E through contact of the side 35 of the member 32 on the wall of the rounded bottom of the shell.

This movement of the members E and 32 progressively and volumetrically decreases the space between the members E and the shell and the beans will thereby be crushed or otherwise separated into the component parts thereof and forced or squeezed out through the extrusion or discharge holes and into a pan placed below the receptacle by the time the member E is rotated far enough so that the side 35 of the member 32 comes into the place where the short side 34 was at starting.

While the side 35 is so receding toward and into the member E, the side 34 is pushed outwardly of the member E, due to the contact of the side 35 on the eccentric bottom of the shell, and thereby takes hold of some of the beans in the receptacle and moves them around and into the space between the member E and the bottom of the receptacle and separates and squeezes out of the receptacle, by compression thereof, the component parts as explained above although some of this separation is attained by the side 34 in taking hold of beans.

When the side 34 so takes hold of beans at the longitudinal middle part of the member E, an agitation is created in the beans in the receptacle which agitation is quite helpful in stirring up the material in the receptacle so that the sides of the member 32 can better take hold of the material.

When the side 35 leaves the bottom of the receptacle and enters the top part thereof, it takes hold of material all the way along longitudinally of the member E and moves material into the bottom of the receptacle and out through the discharge holes in a manner similar to the operation of the side 34. Agitation of material in the receptacle is attained similar to the agitation produced or created by the side 34 as described above.

The separating of the component parts of material in the receptacle is attained first by the sides 34 and 35 taking hold of some of the material and cutting parts thereof, as, for instance, cutting a number of beans, previous to moving the pieces into the bottom of the receptacle to be compressed therein and further separated and squeezed out as is explained above.

This separating and squeezing also separates the skin or fibrous component parts of the material from the meat thereof, as for instance, separating the skin of the beans from the meat thereof, and meat is forced out through the discharge holes but the skins remain in the receptacle and are collected in the grooves or pockets 40 from where the same can be removed easily either through the top of the receptacle or by disassembling of the device as explained above.

The member 32 can be removed individually through the top of the receptacle when the member E is rotated so that the side 35 of the member 32 is vertically disposed but can not fall out of the member E.

It is preferred that the parts of the device be made of rust-proof material to prevent contamination of material operated upon and be made of acid proof material when acid material, such as the acid fruits, is to be operated upon.

The device shown and described, upon operation thereof, separates into component parts the material placed into the receptacle, forces or squeezes out of the receptacle the desired component parts, and retains within the receptacle, for later removal thereof, the component parts which are not to be mixed with the desired parts.

I am aware that changes and modifications can be made in the structure and arrangement of parts shown and described; therefore, without limiting myself to the precise structure and arrangement of parts as shown and described,

I claim:

1. A device of the character described including a receptacle for material to be operated upon having a discharge means, a member eccentrically within said receptacle, and a single part movable in said member and having the material engaging ends thereof of different widths to engage material in said receptacle and to put different pressures thereon during one revolution of said member to force the material out of said receptacle through said discharge means with different pressures upon operation of said member.

2. A device of the character described including a receptacle for material to be operated upon having a discharge means, a member eccentrically within said receptacle, and a part movable in said member to engage material in said receptacle and to put a pressure thereon to force the same out of said receptacle through said discharge means upon operation of said member; said part being of trapezoidal formation to promote agitation of the material in said receptacle.

3. A device of the character described including a receptacle for material to be operated upon, said receptacle having a discharge means, a member eccentrically within said receptacle, and a part movable in said member to agitate the material and having two operating edges, one being longer than the other, to separate the same into component parts thereof, to engage material in said receptacle, to force some of the separated parts out of said receptacle through said discharge means, and to retain others of the parts in said receptacle.

4. A device of the character described including a receptacle for material to be operated upon, said receptacle having a discharge means, a rotatable member eccentrically within said receptacle, a part movable in said member and having the operating ends thereof of unequal length to agitate the material, to separate the same into component parts thereof, to engage material in said receptacle, to force some of the separated parts out of said receptacle through said discharge means, and to retain others of the parts in said receptacle, and sidewise spaced supporting legs for said receptacle of sufficient length and sidewise spacing to permit a pan to be removably placed under said discharge means.

5. A device of the character described including a receptacle for material to be operated upon having discharge holes therethrough, a member rotatable in said receptacle, a blade extending through said member, slidable axially therein, the diametrically opposite edges thereof adapted to contact said receptacle upon rotation of said member and having one of said edges longer than the other to separate the material into component parts thereof and to force some of said parts through said holes, and means to rotate said member.

CHARLES KRTIL.